United States Patent [19]

Takemura et al.

[11] Patent Number: 4,574,371
[45] Date of Patent: Mar. 4, 1986

[54] APPARATUS FOR RECORDING AND REPRODUCING INFORMATION ON AN OPTICAL DISC

[75] Inventors: Haruhiko Takemura, Hino; Kiichi Kato, Hachioji; Masaharu Sakamoto, Tokyo, all of Japan

[73] Assignee: Olympus Optical Company Limited, Japan

[21] Appl. No.: 466,910

[22] Filed: Feb. 16, 1983

[30] Foreign Application Priority Data

| Feb. 20, 1982 [JP] | Japan | 57-25243 |
| Mar. 2, 1982 [JP] | Japan | 57-28413[U] |
| Mar. 2, 1982 [JP] | Japan | 57-28414[U] |
| May 11, 1982 [JP] | Japan | 57-78680 |

[51] Int. Cl.[4] ............................................. G11B 7/00
[52] U.S. Cl. .................................... 369/100; 369/44; 369/112; 369/121
[58] Field of Search ............... 369/100, 44, 46, 112, 369/111, 109, 45, 121; 350/174

[56] References Cited

U.S. PATENT DOCUMENTS

| 3,960,443 | 6/1976 | Goshima et al. | 369/100 |
| 4,290,122 | 9/1981 | Bates et al. | 369/100 |
| 4,344,164 | 8/1982 | Bricot et al. | 369/44 |
| 4,375,091 | 2/1983 | Dakin et al. | 369/44 |
| 4,399,529 | 8/1983 | Leterme et al. | 369/112 |

FOREIGN PATENT DOCUMENTS

0017433 10/1980 Europen Pat. Off. .............. 369/109

Primary Examiner—Robert L. Richardson
Attorney, Agent, or Firm—Parkhurst & Oliff

[57] ABSTRACT

An optical recording and reproducing apparatus includes a first semiconductor laser for emitting a recording laser beam whose intensity is modulated in accordance with an information signal to be recorded and a second semiconductor laser for emitting a reproducing laser beam having a constant intensity. The recording and reproducing semiconductor lasers are commonly mounted in a supporting member which is mounted on a pick-up plate arranged movably in a radial direction of a rotating optical disc. The recording and reproducing laser beams are composed with each other by means of a substantially parallelogram shaped prism having a reflection surface for reflecting the reproducing laser beam and an optical surface upon which the reproducing laser beam is made incident at an incident angle larger than a critical angle and the recording laser beam is made incident at an incident angle near Brewster's angle. The composed recording and reproducing laser beams are commonly focussed by a single objective lens onto the optical disc in such a manner that the recording laser beam is made incident upon an information track to be formed and the reproducing laser beam is made incident upon a guide track or a previously recorded information track.

31 Claims, 16 Drawing Figures

FIG_6A

FIG_6B

FIG_11

APPARATUS FOR RECORDING AND REPRODUCING INFORMATION ON AN OPTICAL DISC

BACKGROUND OF THE INVENTION

The present invention relates to an optical recording and reproducing apparatus comprising a recording light source for emitting a recording light beam, a reproducing light source for emitting a reproducing light beam and an objective lens for focussing commonly the recording and reproducing light beams onto an optical record medium.

Such an optical recording and reproducing apparatus has been known and there also are many kinds of optical record media such as an optical disc having a thin layer of photoresist or metal and an opto-magnetic disc using a rotation of a polarization plane. In such an apparatus, when an information signal is recorded, the recording light source is modulated by the information signal to be recorded and at the same time the reproducing light beam having a constant intensity is made incident upon a guide track or a previously recorded information track. The reproducing light beam reflected by the record medium is made incident upon a light detector to derive focussing and tracking control signals. In order to position correctly spots of the recording and reproducing beams with respect to the tracks in the record medium, it is advantageous to focus these beams commonly by a single objective lens. To this end, these light beams must be composed by suitable optical members into a substantially single light beam. However, in practice, it is rather difficult to effect such a composition by means of usual optical members without causing a loss of light intensity. For instance, if a half mirror is used, half of the light intensity is lost. It should be noted that even if small semiconductor lasers are used as the recording and reproducing light sources, they cannot be arranged close enough to each other to produce laser beams which can be assumed to be substantially a single beam.

In general, since the output power of the recording light source is higher than the reproducing light source, an ambient temperature in the proximity of the recording light source becomes higher than that in the proximity of the reproducing light source. Therefore, the degree of thermal deformation of various optical members arranged near the recording and reproducing light sources might vary. This variation results in a deviation of a positional relation between the beam spots and the tracks on the record medium. For instance, a pitch of successive information tracks formed on the record medium when recording might be varied. Moreover, in such an event, the focussing and tracking control signals could not be obtained correctly.

SUMMARY OF THE INVENTION

The object of the present invention is to mitigate the above drawbacks of the known apparatus and to provide a novel and useful optical recording and reproducing apparatus in which a positional relation between beam spots and tracks on a record medium can be maintained substantially constant.

According to the invention, in an information recording and reproducing apparatus having an objective lens for focussing onto a record medium recording and reproducing light beams emitted from recording and reproducing light sources, the improvement comprises a single composing optical member arranged between the light sources and objective lens and having a reflection surface which reflects one of the recording and reproducing light beams and an optical surface upon which the light beam reflected by said reflection surface is made incident at an incident angle not smaller than a critical angle and the other light beam is made incident at an incident angle at which almost all the other light beam is transmitted through the optical surface, for emitting composed recording and reproducing light beams; and means comprising a plurality of optical members for directing the composed recording and reproducing light beams toward the objective lens.

DESCRIPTION OF THE PREFERRED EMBODIMENTS

Figure 1:
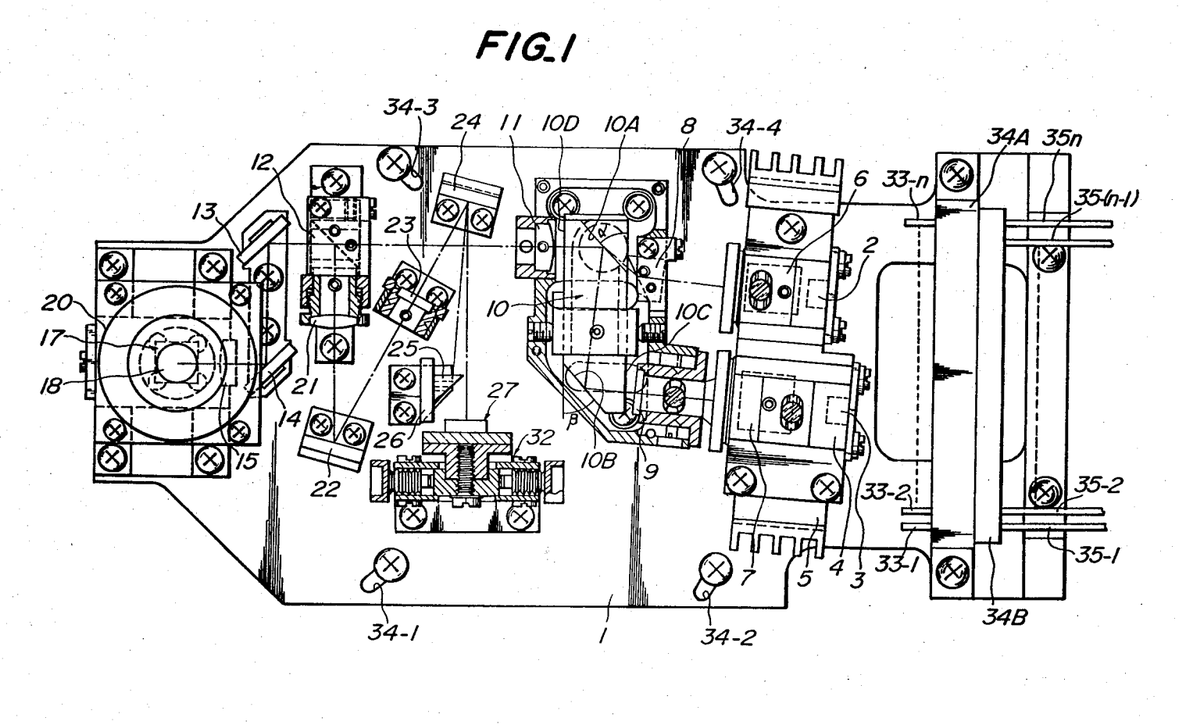
FIG. 1 is a plan view showing an embodiment of the optical recording and reproducing apparatus according to the invention.

FIG. 1 is a plan view showing partially in cross section one embodiment of the optical recording and reproducing apparatus according to the invention. In the present embodiment, use is made of an optical disc as a record medium. The apparatus comprises a pick-up plate 1 arranged movably in a radial direction of the optical disc. On the pick-up plate 1 are arranged a recording semiconductor laser 2 and a reproducing semiconductor laser 3 at an end portion of the plate 1 viewed in its moving direction. These semiconductor lasers 2 and 3 emit laser beams having a wavelength of 820 nm and are commonly mounted on a supporting member 4 in the form of a casing which is then fixed to the pick-up plate 1 by means of a base plate 5 having a heat radiating function. For this purpose, the base plate 5 has formed heat radiation fins at both sides thereof. The semiconductor lasers 2 and 3 are so secured to the supporting member 4 that the recording and reproducing laser beams are parallel to each other. The laser beams emitted from the semiconductor lasers 2 and 3 are converted into parallel beams by means of collimator lens 6 and 7, respectively which are adjustably mounted on the supporting member 4. The recording parallel beam is made incident upon a composing prism 10 via a deflecting prism 8 and the reproducing laser beam is converted by a grating 9 into three diffracted beams (−1, 0 and +1-order) which are then made incident upon the composing prism 10. The deflection prism 8, grating 9 and composing prism 10 are adjustably secured to the pick-up plate 1.

The composing prism 10 is formed by a substantially parallelogram shaped prism and has an optical surface 10A upon which the recording laser beam transmitted through and refracted by the deflection prism 8 is made incident at an incident angle (e.g. Brewster's angle) at which almost all of the laser beam is transmitted therethrough and a reflection surface 10B which totally reflected the three reproducing laser beams toward said optical surface 10A at incident angles equal to or larger than the critical angle. Therefore, the recording laser beam impinging upon the optical surface 10A via the deflecting prism 8 is almost all transmitted through the optical surface 10A and the reproducing laser beams which are reflected by the reflection surface 10B and are made incident upon the optical surface 10A are substantially totally reflected by the optical surface 10A. In this manner the recording and reproducing laser beams are composed by the prism 10 without producing a loss and the composed laser beams exit from the prism 10 substantially as a single beam. In the present embodiment, the composing prism 10 is made of glass (BK7) having a refractive index of 1.51 and anti-reflection coatings for the wavelength 820 nm are applied on a prism surface 10C through which the reproducing beams enter the prism and an exit surface 10D from which the composed laser beams emanate. The recording and reproducing laser beams are P-polarized and the optical surface 10A is formed by five layers of $TiO_2$-$SiO_2$-$TiO_2$-$SiO_2$-$TiO_2$ applied successively on the prism surface. $TiO_2$ and $SiO_2$ have refractive indices of 2.2 and 1.46, respectively. When the optical surface 10A has the multi-layer construction, it is possible to make a refraction angle at the surface 10A for the recording laser beam impinging from the air as close as possible to the critical angle at which the reproducing laser beams are made incident upon the surface 10A from the bulk of the prism 10, and therefore the recording and reproducing laser beams can be composed with each other, while a very small angle is existent therebetween. For instance, a distance between a recording laser beam spot and a center reproducing beam spot formed on the optical disc by means of an objective lens having a focal length of 5 mm can be decreased to several tens of microns.

In the present embodiment, the entrance surface 10C and exit surface 10D of the composing prism 10 are in parallel with each other, but the optical surface 10A and reflection surface 10B are not in parallel with each other. For instance, an angle α between the entrance surface 10C and optical surface 10A is 40°30′ and an angle β between the reflection surface 10B and exit surface 10D is 40°5′.

The deflection prism 8 has two function. One function is to deflect the recording laser beam so as to be made incident upon the optical surface 10A of the composing prism 10 at a given incident angle at which the beam is scarcely reflected. The other function is to shape the recording laser beam refracted by and transmitted through the optical surface 10A of the prism 10 into a circular cross sectional light flux. In general, the laser beam emitted from the semiconductor laser has an elliptical cross section. The recording laser beam must have a higher intensity than the reproducing laser beams. Therefore, it is preferable to convert a recording laser beam having an elliptical cross section into a beam having a circular cross section without a loss of power. In contrast, since the reproducing laser beams need not have high intensity, the reproducing beams may be converted into circular beams by means of a mask having a circular aperture arranged between the collimator lens 7 and grating 9. However, in FIG. 1 such a mask is not shown.

Figure 2:
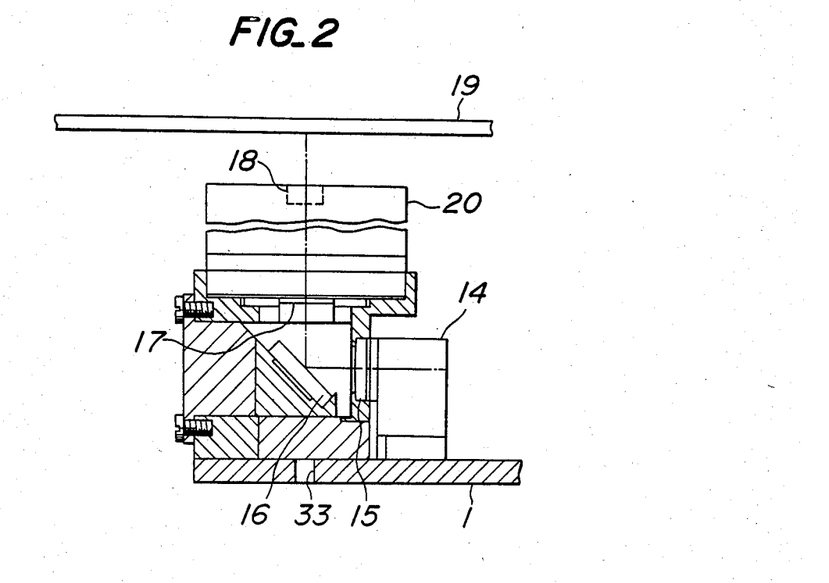
FIG. 2 is a cross section illustrating a portion of the apparatus shown in FIG. 1.

The composed recording and reproducing laser beams emanating from the composing prism 10 are passed successively through a relay lens 11, a polarization beam splitter 12, relfection mirrors 13 and 14 and a relay lens 15. The beams then are made incident upon a reflection mirror 16 as shown in FIG. 2. The mirror 16 is arranged to reflect the laser beams upwardly. The thus reflected beams are passed through a quarter wavelength plate 17 and are focussed commonly by an objective lens 18 to form beam spots on the optical disc 19. The objective lens 18 is driven both in the optical axis direction and in a direction perpendicular to the optical axis and to the traveling direction of the pick-up plate 1 by means of an objective lens driving device 20 including focussing and tracking control mechanisms which may be formed by any known mechanisms.

Figure 3:
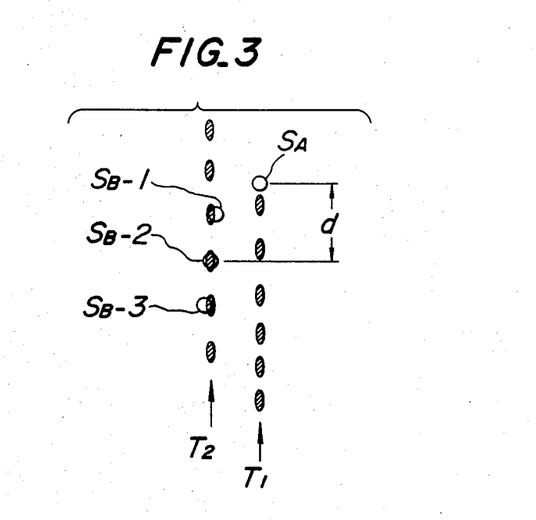
FIG. 3 is a schematic view representing a positional relation between beam spots and tracks.

FIG. 3 illustrates a positional relation between the laser beam spots and tracks on the optical disc 19. The recording beam spot $S_A$ is made aligned with an information track $T_1$ and the three reproducing beam spots $S_B$-1, $S_B$-2 and $S_B$-3 are positioned on a previously formed information track or a guide track $T_2$ adjacent to the track $T_1$. The central reproducing laser beam spot $S_B$-2 is positioned at a center of the track $T_2$ and is spaced apart from the recording beam spot $S_A$ by a distance d. The remaining reproducing beam spots $S_B$-1 and $S_B$-3 are positioned on both edges of the track $T_2$.

Figure 4:
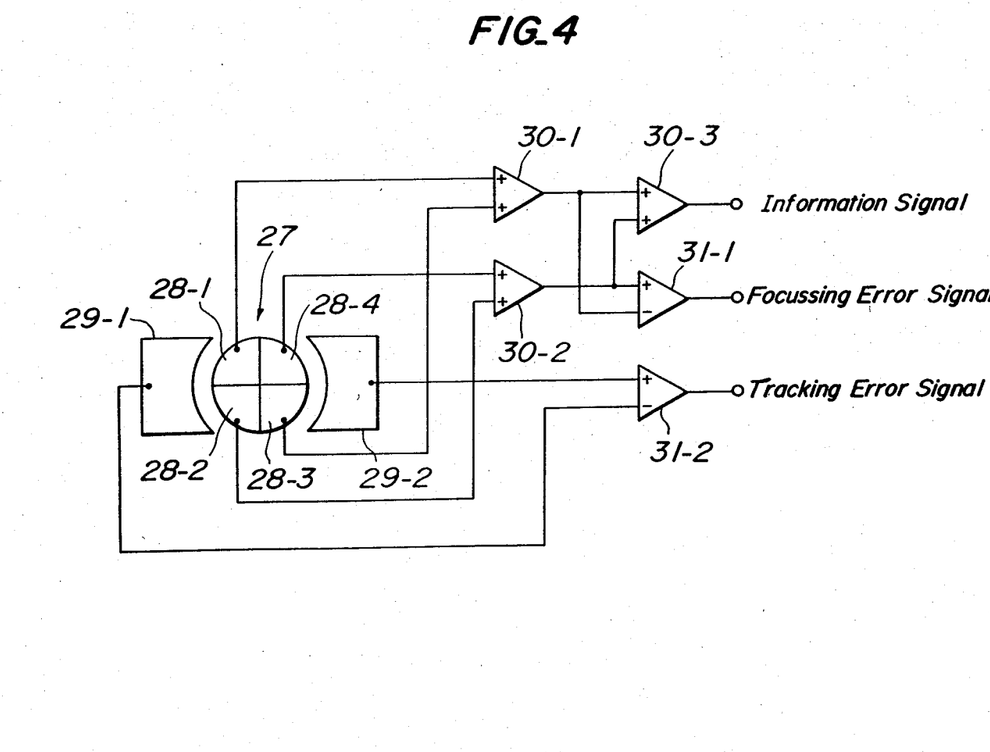
FIG. 4 is a schematic view depicting an embodiment of a light detector receiving a reproducing light beam.

The recording and reproducing laser beams reflected by the optical disc 19 are collected by the objective lens 18 and are transmitted through the quarter wavelength plate 17. Then the P-polarized beams are converted into S-polarized beams. These S-polarized beams are made incident upon the polarizing beam splitter 12 via the mirror 16, lens 15 and mirrors 14 and 13 and are now reflected by the splitter perpendicularly to the incident light path. The reflected laser beams are made incident upon a reflection mirror 24 by means of a lens 21, a reflection mirror 22 and a cylindrical lens 23. The recording laser beam reflected by the mirror 24 is made incident upon a first light detector 26 via a totally reflecting prism 25, and the three reproducing laser beams are made incident upon a second light detector 27. As shown in FIG. 4, the second light detector 27 comprises four divided light receiving regions 28-1 to 28-4 and a pair of light receiving regions 29-1 and 29-2 arranged on both sides of the regions 28-1 to 28-4. The central beam corresponding to the center beam spot $S_B$-2 shown in FIG. 3 is made incident upon the central four light receiving regions 28-1 to 28-4 and the two extremely positioned laser beams corresponding to the beam spots $S_B$-1 and $S_B$-3 are made incident upon the light receiving regions 29-1 and 29-2, respectively.

Output signals produced from diagonally aligned light receiving regions 28-1, 28-3 and 28-2, 28-4 are summed up with each other by adders 30-1 and 30-2, respectively. Output signals from the adders 30-1 and 30-2 are further summed up with each other by an adder 30-3 to produce an information signal. The output signals from the adders 30-1 and 30-2 are also supplied to a differential amplifier 31-1 to produce a focussing error signal which represents a mutual positional deviation between the beam spot and the track in the optical axis direction. Output signals from the side light receiving regions 29-1 and 29-2 are supplied to a differential amplifier 31-2 to derive a tracking error signal which represents a positional deviation of the beam spots with respect to the information track or guide track $T_2$ in the direction perpendicular to the track direction. The focussing and tracking error signals thus produced are supplied to the focussing and tracking control mechanisms in the objective lens driving device 20 so that the beam spots can be correctly focussed on the tracks of the optical disc 19 and at the same time, the beam spots can accurately follow the tracks. In order to align the given light receiving regions of the second light detector 27 with respect to the three reproducing beams, and second light detector 27 is mounted on the pick-up plate 1 by means of a alignment device 32 which can support the second light detector 27 movably in a two-dimensional manner.

In case of recording the information onto the optical disc 19, the intensity of the recording laser beam emitted from the recording semiconductor laser 2 is modulated in accordance with the information signal to be recorded and the thus modulated recording beam is focussed onto the tracks $T_1$ of the optical disc 19 and at the same time the three reproducing beams are focussed on the guide track $T_2$ of the optical disc 19, while the three reproducing beams reflected from the optical disc are received by the second light detector 27 to derive the focussing and tracking error signals. Further, in the recording operation, the recorded information signal can be monitored with the aid of the output signal supplied from the first light detector 26.

In case of reproducing the information recorded on the optical disc 19, only the reproducing semiconductor laser 3 is driven to produce the three reproducing beams which are made incident upon the information track on the optical disc 19. The reproduced information signal can be derived from the second light detector 27 as has been explained above with reference to FIG. 4. It is a matter of course that during the reproduction the focussing and tracking control is also effected in accordance with the focussing and tracking error signals derived from the second light detector 27.

On the pick-up plate 1 there is further mounted a female connector 34A having terminals 33-1 to 33-n connected to the semiconductor lasers 2 and 3, the focussing and tracking control mechanisms of the objective lens driving device 20 and the first and second light detectors 26 and 27. A male connector 34B which can be detachably coupled with the female connector 34A has terminals connected to lead wires 35-1 to 35-n which extend in the radial direction of the optical disc along which the pick-up plate 1 is moved.

As shown in FIG. 2, in the pick-up plate 1 there is formed a hole 33 in alignment with an optical axis of the objective lens 18. Further as illustrated in FIG. 1 in the pick-up plate 1 there are further formed four arcuate recesses 34-1 to 34-4 which are concentrical with the hole 33.

Figure 5:
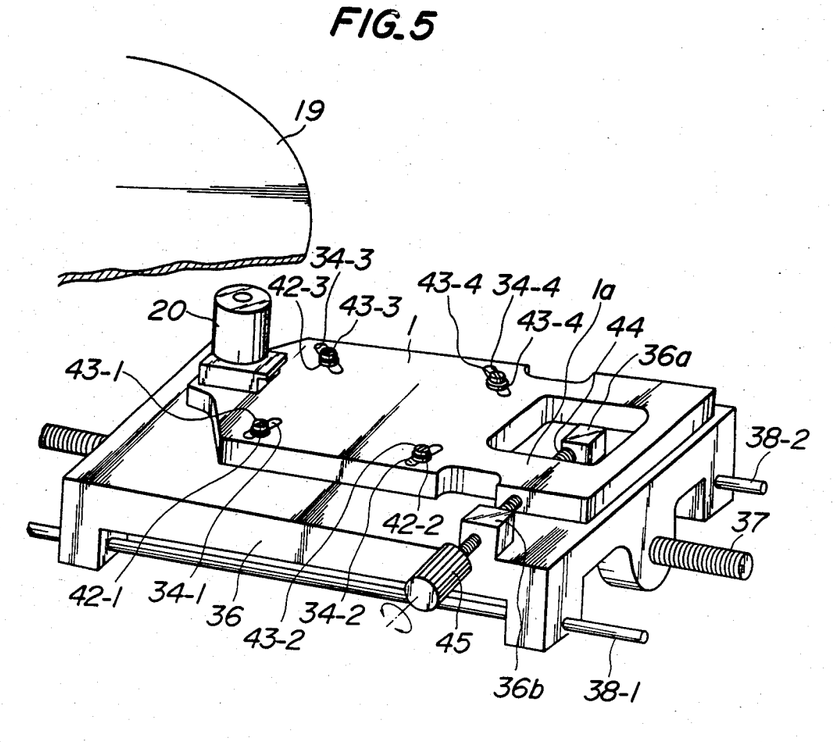
FIG. 5 is a perspective view showing an embodiment of a mechanism for rotating a pick-up plate on a carriage according to the invention.

As shown in FIG. 5, the pick-up plate 1 is placed on a carriage 36 which is slidably supported by a pair of guide rods 38-1 and 38-2 which extend in the radial direction of the optical disc 19. By rotating a lead screw 37, the carriage 36, i.e. the pick-up plate 1 can be moved along the guide rods 38-1 and 38-2. In FIG. 5, only the objective lens driving device 20 is shown and the remaining optical members are all omitted.

Figure 6A:
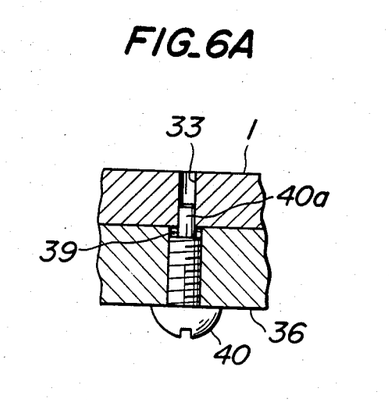
FIGS. 6A and 6B are cross sections of portions of the mechanism shown in FIG. 5.
Figure 6B:
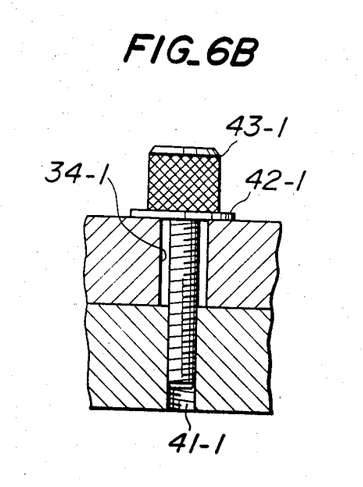

As clearly shown in FIG. 6A, in the carriage 36 there is formed a threaded hole 39 at a position in alignment with the hole 33 formed in the pick-up plate 1. In the hole 39 is threaded a screw 40 from a side opposite to the pick-up plate 1 and a pin portion 40a of the screw 40 is inserted into the hole 33. Therefore, the pick-up plate 1 can be rotated on the carriage 36 about the pin portion 40a. There are further formed in the carriage 36 four threaded holes in alignment with respective elongated recesses 34-1 to 34-4. In FIG. 6B, the hole 41-1 corresponding to the recess 34-1 is shown in cross section. Into the holes 41-1 to 41-4 are threaded screws 43-1 to 43-4, respectively from the side of the pick-up plate 1 via washers 42-1 to 42-4, respectively so as to fasten the pick-up plate 1 onto the carriage 36.

In the present embodiment, in order to adjust the position of the beam spots with respect to the tracks on the optical disc 19, the pick-up plate 1 is rotated about the pin portion 40a, i.e. the optical axis of the objective lens 18 or an axis near the optical axis of the objective lens 18. For this purpose, as clearly illustrated in FIG. 5, there are two posts 36a and 36b are formed integrally with the carriage 36 and a coiled spring 44 is inserted between the post 36a and a projection 1a integrally formed with the pick-up plate 1. Further an adjusting screw 45 is threaded into the post 36b and a side surface of the projection 1a is resiliently urged against the front end of the screw 45. Therefore, by rotating the screw 45, it is possible to rotate finely the pick-up plate 1 on the carriage about the pin portion 40a so as correctly to position the beam spots with respect to the tracks on the optical disc 19. After the correct positioning has been attained, the pick-up plate 1 is fixed by tightening the screws 43-1 to 43-4. Since the carriage 36 is moved accurately in the disc radial direction by rotating the lead screw 37, the correct positioning of the beam spots with respect to the tracks on the optical disc 19 can be maintained over the whole moving distance of the carriage 36.

Figure 7A:
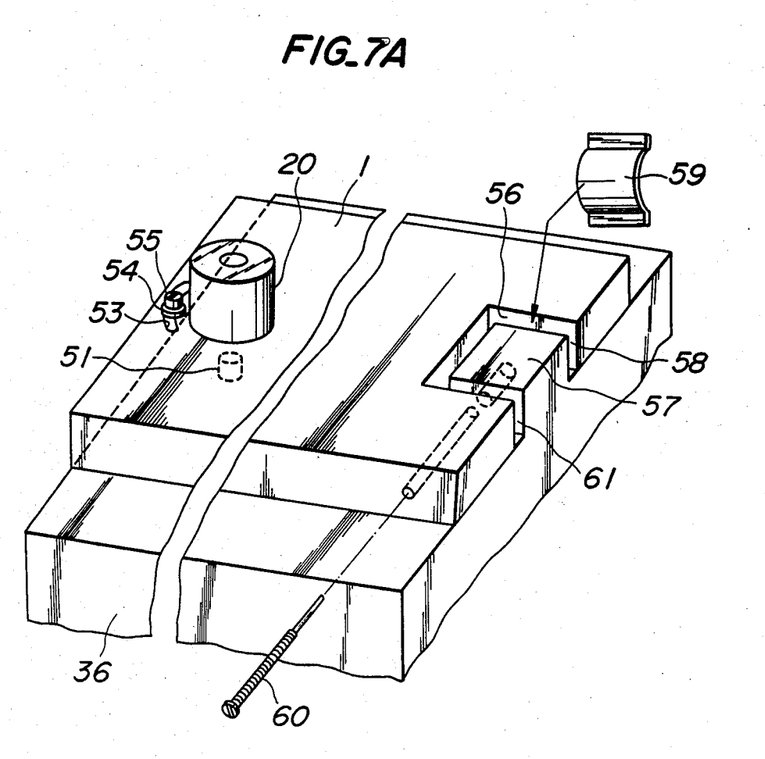
FIGS. 7A, 7B and 7C show another embodiment of the pick-up plate rotating mechanism according to the invention.
Figure 7B:
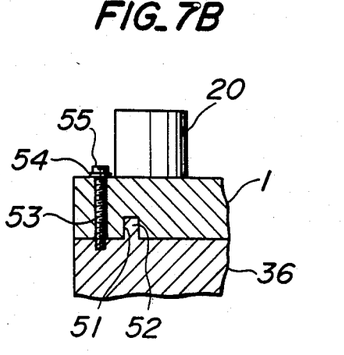
Figure 7C:
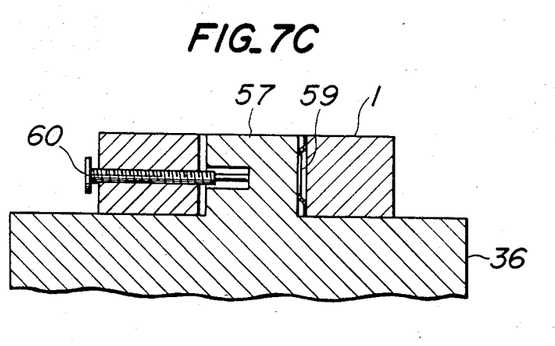

FIGS. 7A, 7B and 7C show another embodiment of the mechanism for rotating the pick-up plate 1 on the carriage 36 about an axis in alignment with or in proximity to the optical axis of the objective lens 18. A hole 51 is formed in the pick-up plate 1 in alignment with said axis. A pin 52 formed integrally with the carriage 36 is inserted into the hole 51. In this manner the pick-up plate 1 can be rotated on the carriage 36 about the pin 52. An arcuate recess 53 concentric with the hole 51 is formed in the pick-up plate 1. A screw 55 is passed through a washer 54 and the recess 53 and is threaded into the carriage 36 as best shown in FIG. 7B. A rectangular recess 56 is formed in the pick-up plate 1 at an end thereof remote from the hole 51. A projection 57 formed integrally with the carriage 36 is inserted into the recess 56. In a space 58 between the projection 57 and the wall of the recess 56 a leaf spring 59 is inserted, bent in such a manner that the pick-up plate 1 is biased to rotate in the anti-clockwise direction about the pin 52 in FIG. 7A. An adjusting screw 60 is threaded into a hole formed in the plate 1 and a front end of the screw 60 is urged against the projection 57 via a space 61. Therefore, by rotating the screw 60, it is possible to rotate finely the pick-up plate 1 about the pin 52 so that the beam spots can be positioned accurately on the optical disc with respect to the tracks. After obtaining the correct positioning, the screw 55 is fastened and a suitable adhesive is poured into the spaces 58, 61 between the plate 1 and the carriage 36.

Figure 8A:
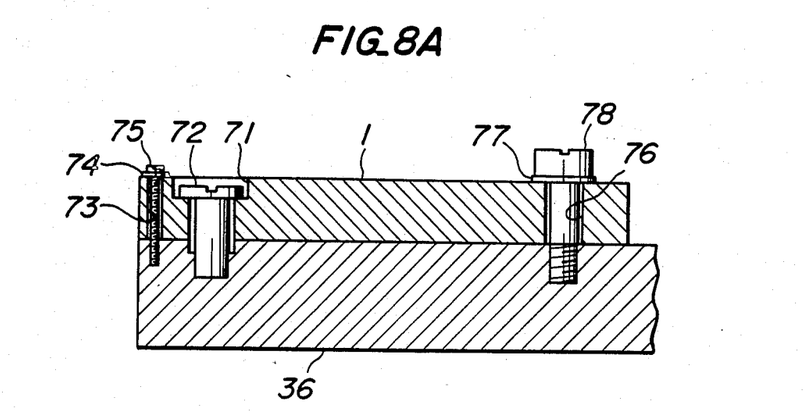
FIGS. 8A and 8D illustrates still another embodiment of the pick-up plate rotating mechanism according to the invention.
Figure 8B:
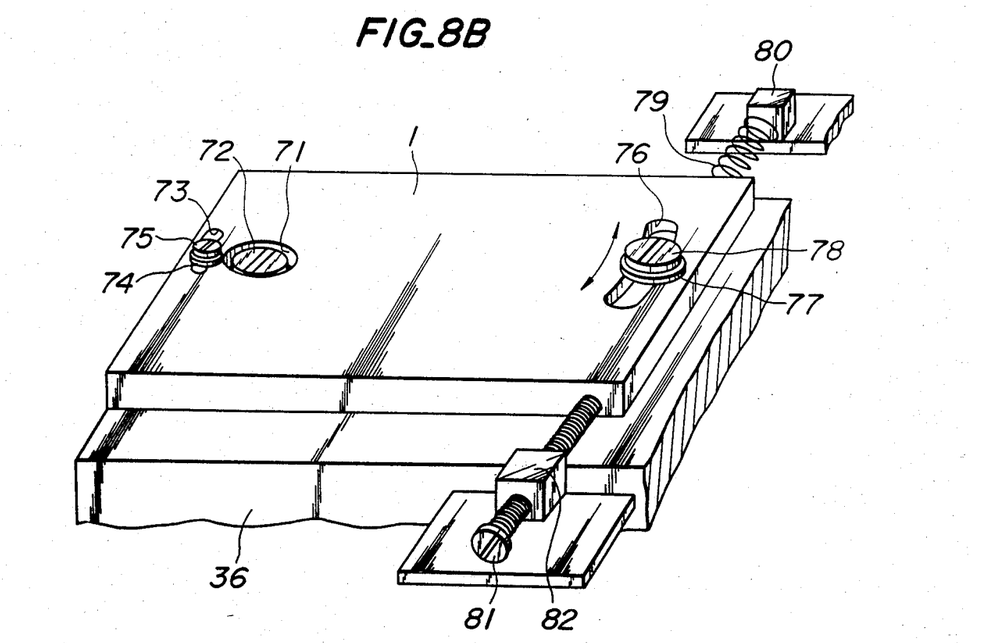

FIGS. 8A and 8B show still another embodiment of the positioning mechanism. In this embodiment, a hole 71 is formed in the pick-up plate 1 at a position in alignment with the optical axis of the objective lens or in the proximity thereof. A screw 72 is passed through the hole 71 and is threaded into the carriage 36. An arcuate recess 73 is formed in the pick-up plate 1 concentrically with the hole 71. A screw 75 is passed through a washer 74 and the recess 73 and is threaded into the carriage 36. An arcuate recess 76 is formed in the plate 1 concentrically with the hole 71 at a position remote from the hole 71. A screw 78 is passed through a washer 77 and the recess 76 and is threaded into the carriage 36. In order to rotate finely the pick-up plate 1 about the screw 72, there are arranged on both sides of the pick-up plate 1 a member 80 for supporting a coiled spring 79 and a member 82 for supporting an adjusting screw 81, respectively. These members 80 and 82 are secured to suitable members other than the carriage 36. Also in this embodiment, it is possible to rotate accurately the pick-up plate 1 about the screw 72 so that the beam spots can be correctly positioned with respect to the tracks on the optical disc. After the positioning, the pick-up plate 1 is fixed onto the carriage 36 by tightening the screws 75 and 78 which then are fixed by pouring adhesive in the hole 71 and recess 76. After that the adjusting members 80 and 82 are removed. In this manner, the weight of the parts to be moved in the radial direction of the optical disc can be decreased.

Figure 9:
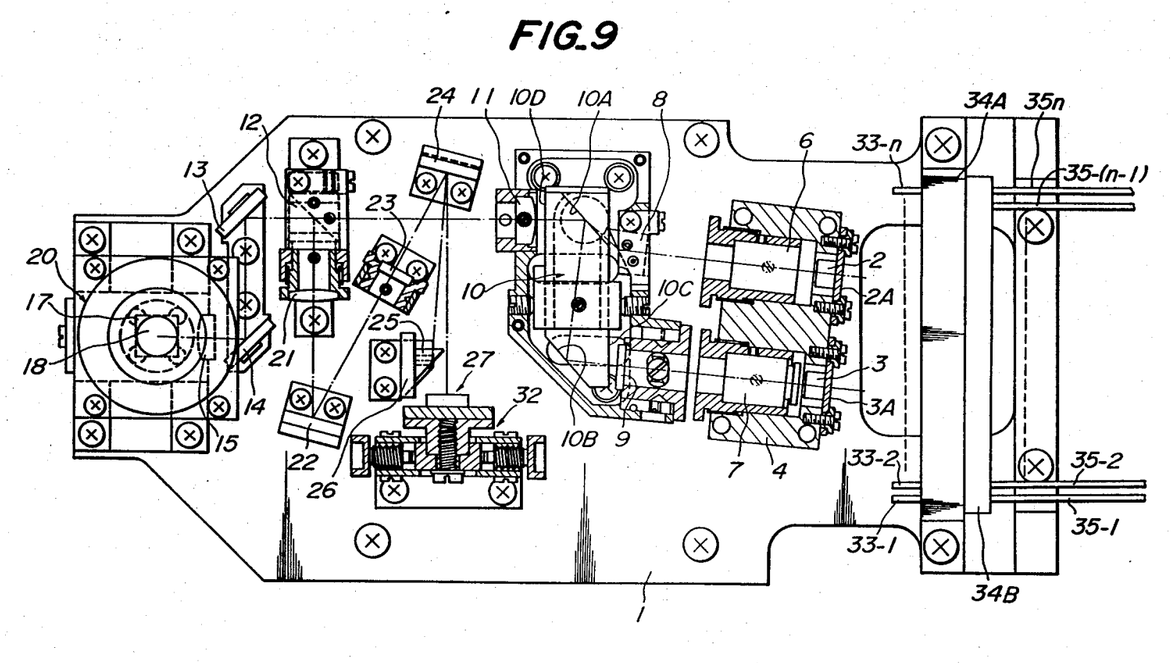
FIG. 9 is a plan view showing partially in cross section another embodiment of the recording and reproducing apparatus according to the invention.
Figure 10A:
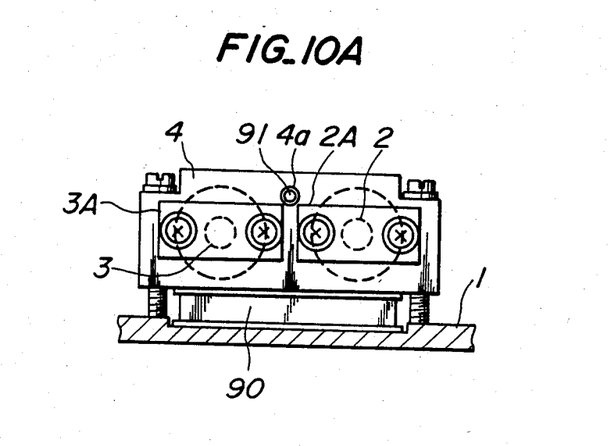
FIGS. 10A and 10B show a portion of the apparatus illustrated in FIG. 9.
Figure 10B:
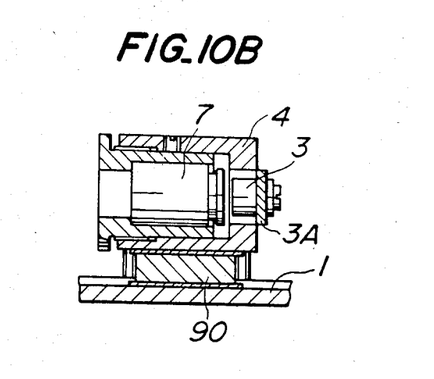

FIG. 9 is a plan view showing partially in cross section another embodiment of the optical recording and reproducing apparatus according to the invention. In this embodiment, similar parts as those shown in FIG. 1 are denoted by the same reference numerals used in FIG. 1. In this embodiment, a recording semiconductor laser 2 and a reproducing semiconductor laser 3 are secured to insulating substrates 2A and 3A, respectively and these substrates are then fixed to a common supporting member 4 in the form of a casing. As shown in FIGS. 10A and 10B, the supporting member 4 is secured to the pick-up plate 1 by means of a temperature control member 90 formed by a Peltier element for cooling the supporting member 4. In the supporting member 4 there is formed a hole 4a and a thermistor 91 is inserted into the hole 4a to measure the temperature of the supporting member 4. The remaining construction of the apparatus of this embodiment is same as that shown in FIG. 1 and therefore, its explanation is omitted.

According to the present embodiment, since the recording and reproducing semiconductor lasers 2 and 3 are held commonly by the supporting member 4 whose temperature is controlled by means of the temperature control device 90 and thermistor 91, the output power from these lasers 2 and 3 can be maintained at predetermined values and therefore, it is possible to effect the recording and reproduction very accurately and stably. Moreover, although the output powers of the lasers 2 and 3 and thus amounts of heat radiated from the lasers 2 and 3 are quite different from each other, the temperature of the supporting member 4 can be made constant, so that the degree of heat influence to neighboring optical members can be maintained substantially equal and thus, the positional relation between the beam spots and the tracks on the record medium can be made stable. Moreover, since the recording and reproducing lasers 2 and 3 are supported by the single supporting member 4, the apparatus can be made compact and the optical adjustment can be made easy. Particularly, when the recording and reproducing laser beams emitted from the lasers 2 and 3 are made parallel with each other as in the case of the previous embodiments, the construction of the supporting member itself can be made simple.

Figure 11:
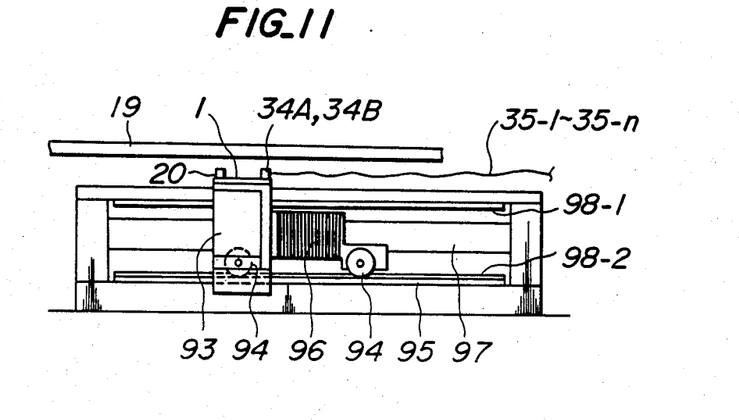
FIG. 11 is a side view depicting a pick-up plate driving mechanism according to the invention.

FIG. 11 is a side view showing an embodiment of a mechanism for moving the pick-up plate 1 in the radial direction of the optical disc 19 by means of a voice coil motor. In this embodiment, the pick-up plate 1 supporting the various optical members such as the objective lens driving device 20 is mounted on a carriage 93 which is moved in the radial direction of the optical disc 19 by means of wheels 94 riding on a pair of rails 95. The carriage 93 has a coil 96 through which is passed a magnetic rod 97 extending in parallel with the rails 95. A pair of magnets 98-1 and 98-2 are arranged above and below the rod 97, respectively to produce magnetic fluxes passing through the coil 96 perpendicularly. By supplying a current to the coil 96 in a given direction, the coil 96 and thus the carriage 93 and pick-up plate 1 are moved along the rod 97 in a given direction.

In the present embodiment, since the pick-up plate 1 is moved in the radial direction of the optical disc by means of the voice coil motor and the lead wires 35-1 to 35-n connected to the pick-up plate 1 are extended also in the radial direction, it is possible to decrease undesired force due to the possible bending of the lead wires and the pick-up plate 1 can be easily held in the balanced condition without providing an additional counter weight. This results in that the pick-up plate 1 can be made light and thus can be smoothly moved by means of a relatively small force and a resonance frequency of the pick-up plate can be easily increased to a less harmful range. In this case, in order to increase the resonance frequency, it will be necessary to align a center of gravity of the pick-up plate with a center of a pick-up plate supporting surface of the carriage 93. In the present embodiment, this alignment can be easily and precisely effected by adjusting a position of screws fixing the plate 1 to the carriage 93, because the lead wires 35-1 to 35-n are extending in the moving direction of the pick-up plate 1.

The present invention is not limited to the embodiments explained above, but many modifications and alterations can be conceived by those skilled in the art within the scope of the invention. For instance, in the above embodiments there are formed three reproducing beams, but only a single reproducing beam may be used. In such a case, the reproducing beam reflected by the optical disc may be received by a four-divided light detector arranged in a far field of the objective lens to produce the focusing and tracking error signals and information signal. Further the recording beam may be made incident upon the reflection surface of the composing optical member and the reproducing beam may be made directly incident upon the optical surface. Moreover the optical surface may be composed of multi-layers such as three and seven layers or may be formed by a single layer. In the above embodiment, the recording and reproducing laser beams are parallel to each other and thus, the composing prism is slightly deviated from a true parallelogram shaped prism. However, the composing prism may be made of a real truly parallelogram shaped prism, if the recording and reproducing laser beams are slightly inclined with respect to each other. In this case, the recording and reproducing semiconductor lasers may be mounted in separate supporting members or in a single supporting member. Further the reproducing beam spots may be situated on the same information track as the recording beam spot at a downstream position thereof. It should be noted that the present invention may be equally applied to the opto-magnetic record disc.

What is claimed is:

1. An apparatus for recording and reproducing information on and from an optical disc recording medium comprising:
    recording and reproducing light sources;
    an objective lens for focussing recording and reproducing light beams emitted from the recording and reproducing light sources onto the optical disc record medium;
    a single composing optical member arranged between the light sources and the objective lens and having a reflection surface which reflects one of the recording and reproducing light beams and an optical surface upon which the light beam reflected by said reflection surface is made incident at an incident angle not smaller than a critical angle of total reflection and the other light beam is made incident at an incident angle substantially equal to Brewster's angle so that almost all of the other light beam is transmitted through the optical surface, for emitting composed recording and reproducing light beams; and
    means comprising a plurality of optical members for directing the composed recording and reproducing light beams toward the objective lens.

2. An apparatus according to claim 1, further comprising a pick-up plate on which the light sources, the composing optical member, and said plurality of optical members of the beam directing means are mounted and means for driving said pick-up plate in a radial direction of the optical disc record medium.

3. An apparatus according to claim 2, wherein said recording and reproducing light sources comprise semiconductor lasers.

4. An apparatus according to claim 3, wherein said recording and reproducing semiconductor lasers are supported by a common supporting member in the form of a casing.

5. An apparatus according to claim 4, wherein said supporting member is secured to the pick-up plate by means of a heat radiating member.

6. An apparatus according to claim 4, wherein said supporting member is secured to the pick-up plate by means of a temperature control member for controlling the temperature of the supporting member and wherein said supporting member is provided with a temperature detection device for measuring the temperature of the supporting means.

7. An apparatus according to claim 6, wherein said temperature control member comprises a Peltier element for cooling said supporting member.

8. An apparatus according to claim 4, wherein said recording and reproducing semiconductor lasers are mounted in the supporting member in such a manner that the recording and reproducing laser beams are parallel to each other.

9. An apparatus according to claim 1, further comprising a deflection prism arranged in a light path of one of the light beams which are to be made incident upon said optical surface of the composing optical member for deflecting said one light beam in such a manner that said one light beam is made incident upon said optical surface at the appropriate incident angle.

10. An apparatus according to claim 9, wherein said deflection prism is inserted in the light path of the recording light beam.

11. An apparatus according to claim 1, wherein said composing optical member is formed by a substantially parallelogram shaped prism in which said optical surface and reflection surface are arranged substantially in parallel with each other.

12. An apparatus according to claim 11, wherein said optical surface of the composing prism comprises a multi-layer construction.

13. An apparatus according to claim 12, wherein said composing prism comprises glass having a refractive index of 1.51 and said optical surface comprises five alternating layers of $TiO_2$ and $SiO_2$ having refractive indices of 2.2 and 1.46, respectively, applied on the composing prism.

14. An apparatus according to claim 11, wherein said composing prism has anti-reflection coatings applied on incident and exit surfaces thereof.

15. An apparatus according to claim 1, wherein said light beams are reflected by said recording medium and the apparatus further comprises a beam splitter arranged between the composing optical member and the objective lens for splitting the light beams directed toward the objective lens and the light beams reflected by the record medium from each other and first and second light detectors for receiving the recording and reproducing light beams, respectively, reflected from the record medium, wherein said first light detector produces an information signal representative of information just recorded on the record medium and the second light detector produces an information signal representative of information previously recorded on the record medium, as well as focussing and tracking error signals.

16. An apparatus according to claim 2, further comprising a carriage having a supporting surface for supporting the pick-up plate thereon and arranged movably in said radial direction, and means for moving said carriage in said radial direction.

17. An apparatus according to claim 16, further comprising means for adjusting a position of the pick-up plate on the carriage.

18. An apparatus according to claim 17, wherein said adjusting means comprises means for supporting the pick-up plate rotatably about an axis which is substantially in alignment with an optical axis of the objective lens, means for rotating finely the pick-up plate about said axis so as to drive the pick-up plate into a given position on the carriage, and means for fixing the pick-up plate in said given position.

19. An apparatus according to claim 16, wherein said means for driving the carriage in the radial direction comprises means for slidably guiding the carriage in the radial direction and a lead screw threaded through the carriage.

20. An apparatus according to claim 16, wherein said means for driving the carriage in the radial direction comprises a voice coil motor including a coil secured to the carriage, a magnetic rod extending through the coil in the radial direction and a pair of magnets arranged above and below the magnetic rod and extending in the radial direction.

21. An apparatus according to claim 16, wherein a plurality of lead wires connected between the pick-up plate and a fixedly arranged electronic device are extended in said radial direction.

22. An apparatus for recording and reproducing information on and from an optical disc comprising:
   a semiconductor laser for emitting a laser beam;
   a collimating means for converting the laser beam emitted from the semiconductor laser into a parallel laser beam;
   means for supporting said semiconductor laser and collimating means in an integral fashion; and
   an objective lens for focussing the parallel laser beam onto the optical disc as a spot.

23. An apparatus according to claim 22, further comprising means for controlling the temperature of said supporting means.

24. An apparatus according to claim 23, wherein said temperature controlling means comprises means for detecting the temperature of the supporting means to produce a detection signal, and means for adjusting the temperature of the supporting means in response to said detection signal.

25. An apparatus according to claim 23, wherein said supporting means is coupled with a pick-up plate by means of said temperature controlling means.

26. An apparatus according to claim 23, wherein said temperature controlling means comprises a Peltier element.

27. An apparatus for recording and reproducing information on and from an optical disc comprising:
   a first semiconductor laser for emitting a first laser beam of high power;
   a second semiconductor laser for emitting a second laser beam of low power;
   a first collimator for converting the first laser beam into a first parallel laser beam;
   a second collimator for converting the second laser beam into a second parallel laser beam;
   means for supporting said first and second semiconductor lasers and said first and second collimators in an integral fashion; and
   an objective lens for focussing said first and second parallel laser beams onto the optical disc as spots.

28. An apparatus according to claim 27, further comprising means for controlling the temperature of said supporting means.

29. An apparatus according to claim 28, wherein said temperature controlling means comprises means for detecting the temperature of the supporting means to produce a detection signal, and means for adjusting the temperature of the supporting means in accordance with the detection signal.

30. An apparatus according to claim 28, wherein said support means is coupled with a pick-up plate by means of said temperature controlling means.

31. An apparatus according to claim 28, wherein said temperature controlling means comprises a Peltier element.

* * * * *